United States Patent
Halim et al.

(10) Patent No.: US 10,101,872 B2
(45) Date of Patent: Oct. 16, 2018

(54) OPERATING SYSTEM EVENTS OF A KIOSK DEVICE

(71) Applicant: Hewlett-Packard Development Company, L.P., Houston, TX (US)

(72) Inventors: Irwan Halim, Houston, TX (US); Josue Villarreal, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 113 days.

(21) Appl. No.: 14/856,662

(22) Filed: Sep. 17, 2015

(65) Prior Publication Data

US 2017/0083205 A1 Mar. 23, 2017

(51) Int. Cl.
*G06F 21/00* (2013.01)
*G06F 3/0481* (2013.01)
*G06F 9/445* (2018.01)
*G06Q 20/18* (2012.01)

(52) U.S. Cl.
CPC ...... *G06F 3/04817* (2013.01); *G06F 9/44505* (2013.01); *G06Q 20/18* (2013.01)

(58) Field of Classification Search
CPC .. G06F 3/048; G06F 3/04817; G06F 9/44505; G06Q 20/18
See application file for complete search history.

(56) References Cited

U.S. PATENT DOCUMENTS

| | | | |
|---|---|---|---|
| 6,513,071 B2 | 1/2003 | Madl et al. | |
| 8,930,774 B1 | 1/2015 | Payne et al. | |
| 9,215,287 B2 * | 12/2015 | Meckler | H04L 67/22 |
| 9,420,088 B2 * | 8/2016 | Hwang | H04M 1/72544 |
| 2003/0016243 A1 * | 1/2003 | Korala | G06Q 20/18 715/741 |
| 2004/0148356 A1 * | 7/2004 | Bishop, Jr. | H04L 51/38 709/206 |
| 2006/0136756 A1 * | 6/2006 | Rothman | G06F 1/3203 713/300 |
| 2007/0143827 A1 * | 6/2007 | Nicodemus | G06F 21/6218 726/2 |
| 2007/0143851 A1 * | 6/2007 | Nicodemus | G06F 21/55 726/25 |
| 2008/0255901 A1 | 10/2008 | Carroll et al. | |

(Continued)

OTHER PUBLICATIONS

Purdy, Dan; "Raspberry Pi Kiosk Screen Tutorial"; Jan. 21, 2014; 32 pages; https://www.danpurdy.co.uk/web-development/raspberry-pi-kiosk-screen-tutorial/.

*Primary Examiner* — Don G Zhao
(74) *Attorney, Agent, or Firm* — HPI Patent Department

(57) ABSTRACT

Example implementations relate to operating system events of a kiosk device. For example, a computing device may include a processor. The processor monitors an operating system of the computing device, where the computing device is to operate as a kiosk device to execute a specific application while restricting access to other applications. The processor identifies an operating system event generated by the operating system and determines, based on a notification restriction list, whether the operating system event is to be restricted. A notification associated with the operating system event is restricted when the operating system even is determined to be restricted and is displayed on a graphical user interface when the operating system event is determined to be unrestricted.

20 Claims, 4 Drawing Sheets

(56) References Cited

U.S. PATENT DOCUMENTS

| | | | | |
|---|---|---|---|---|
| 2009/0174566 A1* | 7/2009 | Volk | G08B 27/005 | 340/691.5 |
| 2010/0105454 A1* | 4/2010 | Weber | G06Q 30/02 | 463/1 |
| 2011/0022191 A1* | 1/2011 | Amit | G06F 9/485 | 700/21 |
| 2012/0023269 A1* | 1/2012 | Wilson | G06F 11/3055 | 710/19 |
| 2013/0159417 A1* | 6/2013 | Meckler | H04L 67/22 | 709/204 |
| 2013/0174100 A1* | 7/2013 | Seymour | G06F 3/0487 | 715/863 |
| 2014/0099997 A1* | 4/2014 | Nakahara | H04M 19/04 | 455/566 |
| 2014/0137188 A1* | 5/2014 | Bartholomay | H04L 65/4084 | 726/3 |
| 2014/0258403 A1 | 9/2014 | Elmore et al. | | |
| 2014/0337611 A1 | 11/2014 | Kuscher et al. | | |
| 2015/0077777 A1* | 3/2015 | Hayakawa | H04N 1/00472 | 358/1.13 |
| 2015/0248549 A1* | 9/2015 | Han | G06F 21/82 | 726/19 |
| 2016/0012465 A1* | 1/2016 | Sharp | G06Q 20/18 | 705/14.17 |
| 2016/0014258 A1* | 1/2016 | Hwang | H04M 1/72544 | 455/418 |
| 2016/0212103 A1* | 7/2016 | Rhoads | H04W 4/008 | |
| 2016/0308888 A1* | 10/2016 | Vargas Gonzalez | H04L 63/1416 | |
| 2017/0017351 A1* | 1/2017 | Singh | G06Q 10/10 | |

* cited by examiner

OPERATING SYSTEM EVENTS OF A KIOSK DEVICE

BACKGROUND

A kiosk device may be a computing device that is to be used for a specific purpose or function. An example of a kiosk device may be an automated teller machine (ATM) that a user may use to access bank account information, withdraw and deposit money, and the like.

BRIEF DESCRIPTION OF THE DRAWINGS

Some examples of the present application are described with respect to the following figures.

DETAILED DESCRIPTION

Figure 1:
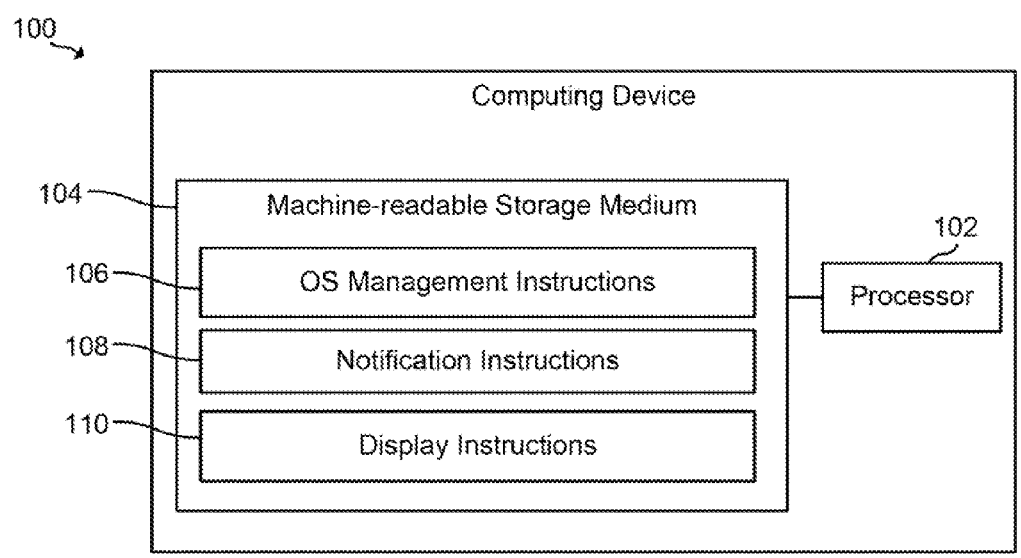
FIG. 1 is a block diagram of an example computing device for displaying notifications associated with operating system events of a kiosk device.

As described above, a kiosk device may be a computing device that is to be used for a specific purpose or function. The kiosk software of the computing device may be designed to perform the specific function while preventing users from accessing system functions, such as notifications about operating system (OS) events. However, these system functions may provide information that may be useful to a user but may be inaccessible to, or restricted from, the user due to these kiosk restrictions. For example, an OS event generated by the OS may be associated with a battery level decreasing to a particular threshold (e.g., battery level reaching 10%), a disconnection from a particular network, and the like. Notifications about these types of OS events, while ordinarily presented to a user, may not be provided in a kiosk environment, even though a user of the kiosk may find such notifications useful.

Examples discussed herein may provide notifications associated with OS events generated by the OS of the kiosk device. For example, a kiosk device may execute a specific kiosk application while restricting access to other applications. The kiosk device may execute the specific kiosk application such that other applications are inaccessible to a user of the kiosk device. For example, a kiosk device that operates as an Automated Teller Machine (ATM) may execute a specific kiosk application to perform the functions of the ATM (e.g., allowing a user to perform banking transaction) while restricting access to other applications of the kiosk device, such as a system application (e.g., an application to display the power level of the device) of the kiosk device. A notification layer between the OS of the kiosk device and the specific application may be used to manage a notification restriction list. A notification restriction list is a list that identifies OS events that are restricted and/or unrestricted, where a notification about a restricted OS event may be prevented from being displayed to a user while the specific kiosk application is running and where a notification about an unrestricted OS event may be provided to the user while the specific kiosk application is running. The notification layer of the kiosk device may monitor the OS of the kiosk device and identify OS events generated by the OS. The notification layer may determine, based on the notification restriction list, whether the OS event is to be restricted. Notifications associated with restricted OS events may be restricted from being displayed, and notifications associated with unrestricted OS events may be provided on a graphical user interface.

In some examples, the notification restriction list may be configurable by a user (e.g., a system administrator). For example, a user may access configuration information to specify notification restrictions for various OS events. The configuration information may specify notification restrictions for any suitable OS events, such as OS events associated with a network connection, a power level, a volume level, a tray icon, a time, a device name, an Internet Protocol (IP) address, a cellular or network signal, a sound, a connection, and the like.

Referring now to the figures, FIG. 1 is a block diagram of an example computing device 100 for displaying notifications associated with OS events of a kiosk device. Computing device 100 may be any suitable computing device capable of operating as a kiosk device to execute a specific application implemented using machine-readable instructions while restricting access to other applications.

Computing device 100 may be, for example, a web-based server, a local area network server, a cloud-based server, a notebook computer, a desktop computer, an all-in-one system, a tablet computing device, a mobile phone, an electronic book reader, a printing device, or any other electronic device suitable for displaying notifications associated with OS events of a kiosk device. Computing device 100 may include a processor 102 and a machine-readable storage medium 104. Computing device 100 may monitor an OS of the computing device 100 (e.g., via kiosk software and/or firmware in computing device 100), where the computing device 100 is to operate as a kiosk device to execute a specific application while restricting access to other applications.

Processor 102 is a tangible hardware component that may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, and 110 to control a process of displaying notifications associated with OS events of a kiosk device. As an alternative or in addition to retrieving and executing instructions, processor 102 may include at least one electronic circuit that includes electronic components for performing the functionality of instructions 106, 108, 110, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an EPROM, an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, and 110 for monitoring an OS of the computing device 100, where the computing device 100 is to operate as a kiosk device to execute a specific application while restricting access to other applications; identifying an OS event generated by the OS; determining, based on a notification restriction list, whether the OS event is to be restricted; restricting a notification associated with the OS event when the operating system event is determined to be restricted; and causing the notification to be displayed on a graphical user interface when the OS event is determined to be unrestricted.

OS management instructions 106 may manage and control the monitoring of the OS of the computing device 100 while the specific kiosk application of the computing device 100 is being executed. OS management instructions 106 may monitor the OS and identify OS events generated by the OS. For example, OS management instructions 106 may intercept OS events as these events occur. The OS events being monitored may be any suitable OS events, such as OS events associated with a network connection, a power level, a volume level, a tray icon, and the like.

Notification instructions 108 may manage and control the determination of whether a particular OS event is to be restricted. Notification instructions 108 may make this determination based on a notification restriction list identifying notifications for various OS events that are to be restricted. For example, notification instructions 108 may receive configuration information associated with OS content that is allowed to be provided and/or is restricted while the specific kiosk application is executed, where the OS content may include content associated with the notification restriction list, a time, a device name, an IP address, a power level, a cellular signal, a sound, a connection, a network signal, and the like. Based on this configuration information, including the notification restriction list, notification instructions 108 may restrict a notification associated with an OS event that is determined to be restricted and may generate and/or allow notifications associated with an OS event that is determined to be unrestricted.

Display instructions 110 may manage and control the display of any unrestricted notifications. For example, display instructions 110 may cause an unrestricted notification to be displayed on a graphical user interface. In some examples, the graphical user interface may be an overlay over content relating to the specific kiosk application being executed by the computing device 100.

In some examples, the notification provided may be a read-only notification such that a user of the computing device 100 may only read the notification but may not be allowed to interact with the notification. In some examples, the notification may be based on a permission associated with the notification, where the permission defines whether the notification is a read-only notification or whether a user is authorized to perform an action based on the notification. In some examples, the processor 102 of the computing device 100 may receive a response to any notifications displayed and may perform an action based on the response. For example, a notification associated with a network connection being lost may be displayed, and a user may provide a response to the notification by interacting with the notification to request a connection to the same or a different network. Based on this response from the user, the request to connect to the same or a different network may be performed.

Figure 2:
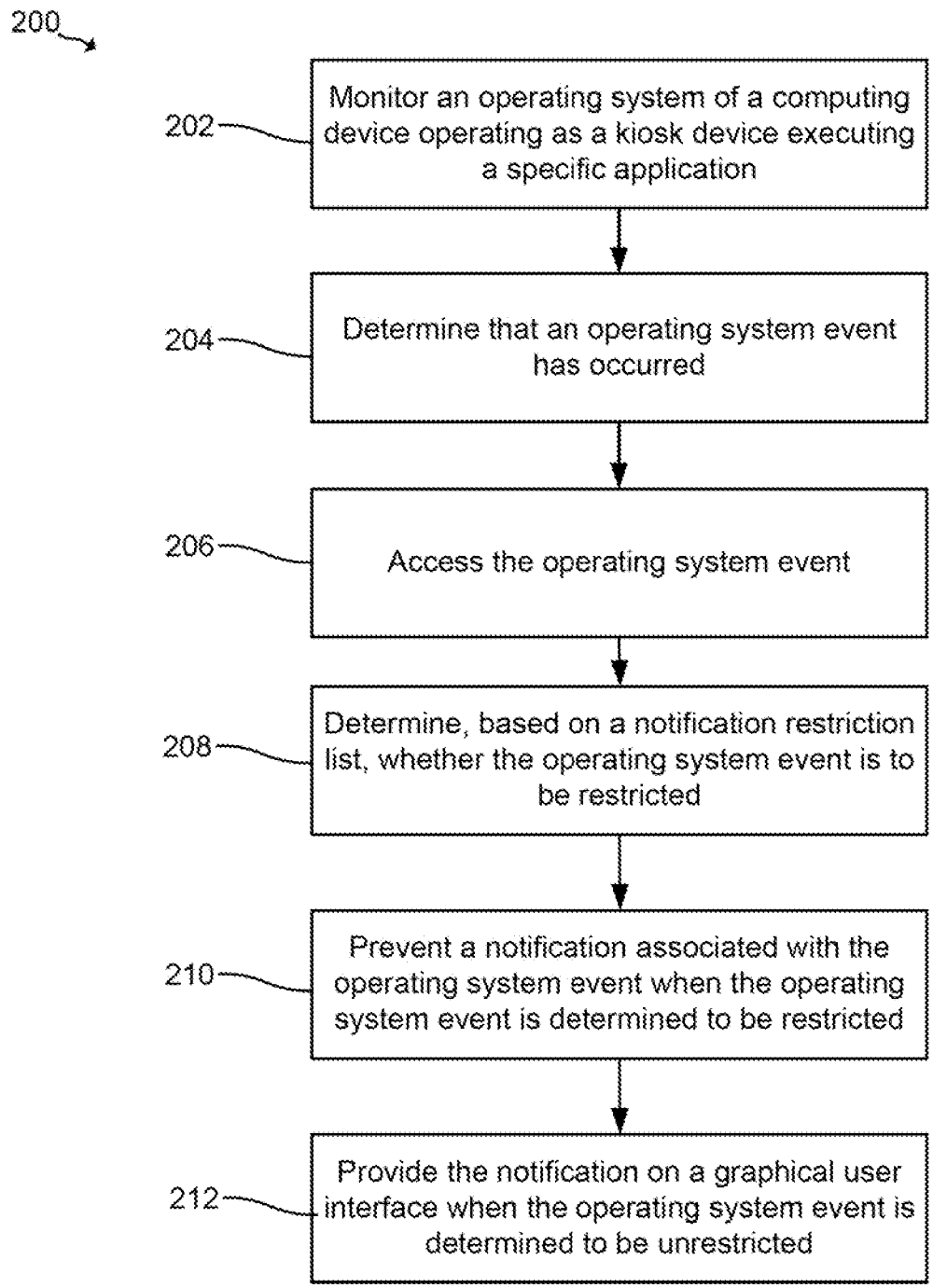
FIG. 2 is a flowchart of an example method for providing notifications associated with operating system events of a kiosk device.

FIG. 2 is a flowchart of an example method 200 for providing notifications associated with OS events of a kiosk device. Method 200 may be implemented using computing device 100 of FIG. 1.

Method 200 includes, at 202, monitoring an OS of a computing device operating as a kiosk device executing a specific application. For example, referring to FIG. 1, the OS management instructions 106 may monitor the OS of the computing device 100 while the specific kiosk application is being executed.

Method 200 also includes, at 204, determining that an OS event has occurred. For example, referring to FIG. 1, the OS management instructions 106 may determine that an OS event has occurred while the OS is being monitored.

Method 200 also includes, at 206, accessing the OS event. For example, referring to FIG. 1, the OS management instructions 106 may access the OS event that has occurred while the OS is being monitored.

Method 200 also includes, at 208, determining, based on a notification restriction list, whether the OS event is to be restricted. For example, referring to FIG. 1, the notification instructions 108 may access and use the notification restriction list to determine whether notifications associated with the OS event are to be restricted or unrestricted.

Method 200 also includes, at 210, preventing a notification associated with the OS event when the OS event is determined to be restricted. For example, referring to FIG. 1, the notification instructions 108 may prevent any notifications associated with restricted OS events from being provided.

Method 200 also includes, at 212, providing the notification on a graphical user interface when the OS event is determined to be unrestricted. For example, referring to FIG. 1, the display instructions 110 may provide the unrestricted notification on a graphical user interface (e.g., an overlay over content of the specific kiosk application).

Figure 3:
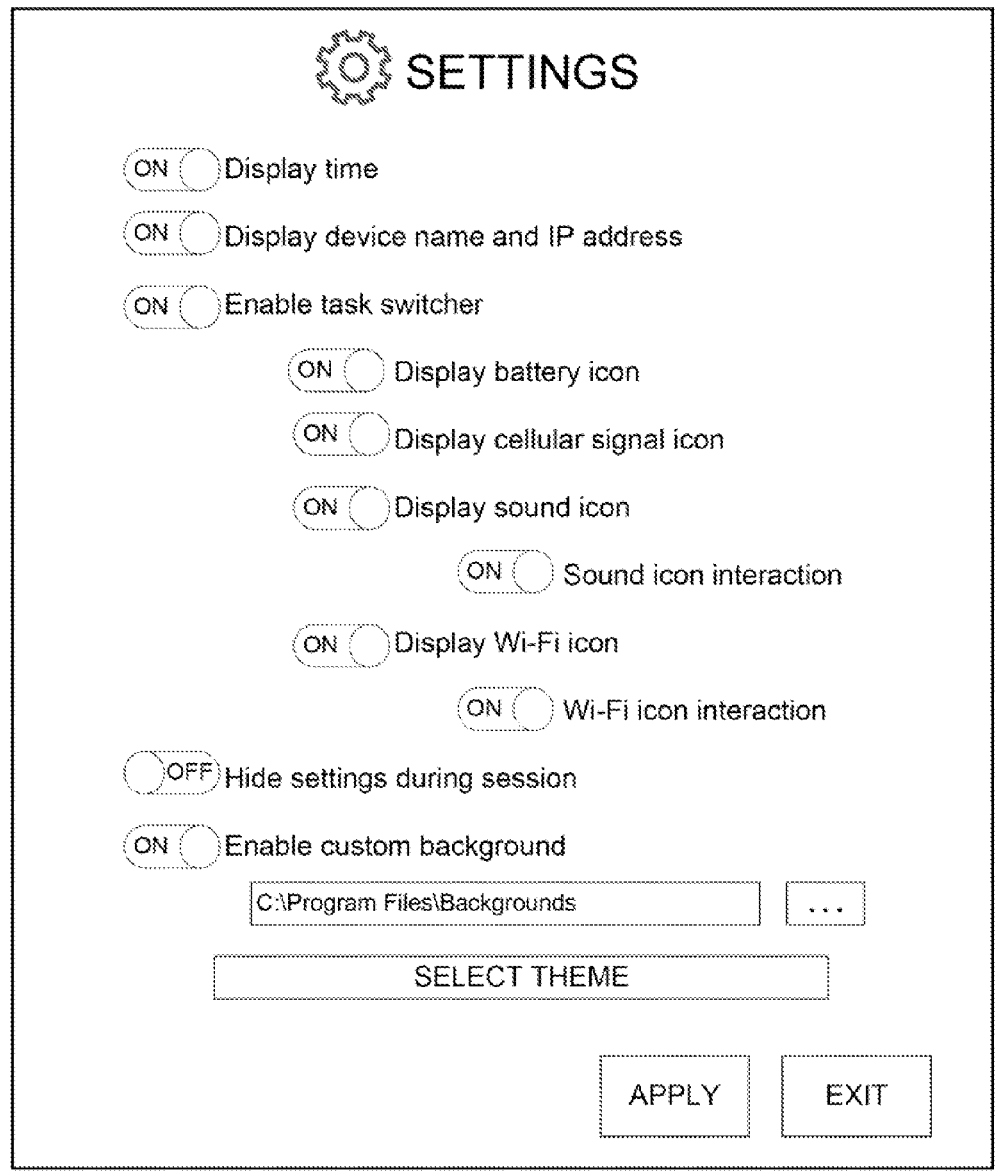
FIG. 3 is an interface diagram of an example graphical user interface for managing settings associated with operating system event notifications to be provided by a kiosk device.

FIG. 3 is a block diagram of an example graphical user interface 300 for managing settings associated with operating system event notifications to be provided by a kiosk device. The graphical user interface 300 may display a notification restriction list identifying notifications that are restricted and/or unrestricted. For example, the graphical user interface 300 shows that notifications associated with a time, a display device name and IP address, a task switcher, a battery icon, a cellular signal icon, a sound icon, a Wi-Fi icon, and the like may be unrestricted, while the settings option may be restricted.

The graphical user interface 300 may also allow the selection of whether a user of the kiosk device may interact with the sound icon and/or the Wi-Fi icon, where allowing an interaction may allow the user to adjust settings associated with the respective icon. The graphical user interface 300 may also allow the selection of a custom background and/or a theme.

Figure 4:
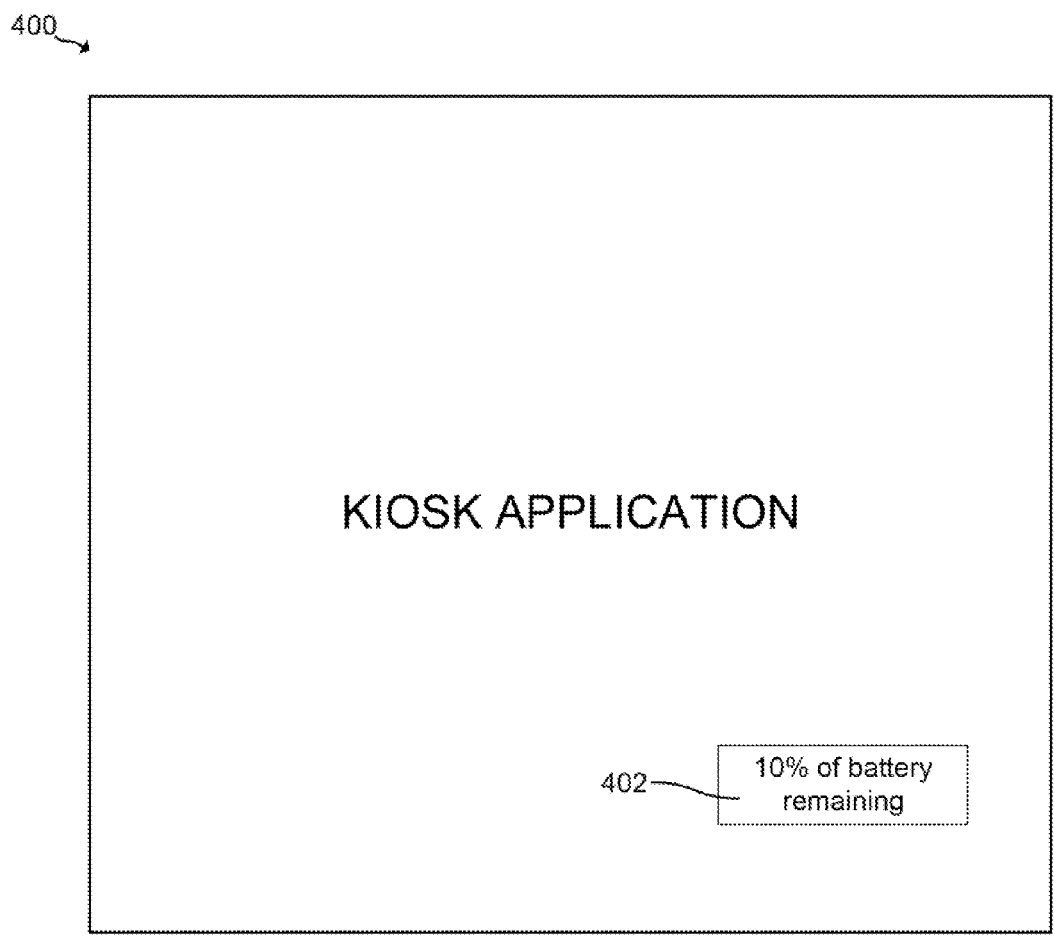
FIG. 4 is an interface diagram of an example graphical user interface for providing notifications associated with operating system events of a kiosk device.

FIG. 4 is a block diagram of an example graphical user interface 400 for providing notifications associated with operating system events of a kiosk device. The graphical user interface 400 may be a graphical user interface of the specific kiosk application being executed by the kiosk device. Based on the notification restriction list, various unrestricted notifications may be provided while various restriction notifications may not be provided. For example, when a notification restriction list specifies that a power level notification is unrestricted, the graphical user interface 402 may be provided when the power level reaches a particular threshold (e.g., 10% of remaining battery life). In some examples, a user may have the option to shut down and/or suspend the computing device, or the computing device may shut down automatically) when the power reaches the particular threshold (e.g., to prevent data loss).

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device, comprising:
a hardware processor to:
monitor an operating system of the computing device, wherein the computing device is to operate as a kiosk device to execute a specific application of the computing device while restricting user access to other applications of the computing device;
identify an operating system event generated by the operating system;
determine, based on a notification restriction list that identifies notifications that are restricted, whether a notification associated with the operating system event is to be restricted;
restrict the notification associated with the operating system event when the operating system event is determined to be restricted; and
cause the notification to be displayed on a graphical user interface when the operating system event is determined to be unrestricted.

2. The computing device of claim 1, wherein the operating system event is associated with a network connection, a power level, a volume level, or a tray icon.

3. The computing device of claim 1, wherein the processor is further to:
receive a response to the notification; and
perform an action based on the response.

4. The computing device of claim 1, wherein the notification is a read-only notification.

5. The computing device of claim 1, wherein the notification is based on a permission associated with the notification, wherein the permission defines whether the notification is a read-only notification or whether a user is authorized to perform an action based on the notification.

6. The computing device of claim 1, wherein the processor is further to receive configuration information associated with operating system content to be provided while the specific application is executed, wherein the operating system content is associated with a time, a device name, an Internet Protocol (IP) address, a power level, a cellular signal, a sound, a connection, or a network signal.

7. The computing device of claim 1, wherein the graphical user interface is an overlay over content of the specific application.

8. A method, comprising:
monitoring, by a computing device, an operating system of the computing device, wherein the computing device operates as a kiosk device executing a specific application of the computing device while restricting user access to other applications of the computing device;
determining, by the computing device, that an operating system event generated by the operating system has occurred;
accessing, by the computing device, the operating system event;
based on a notification restriction list that identifies notifications that are restricted, determining, by the computing device, whether a notification associated with the operating system event is to be restricted;
preventing, by the computing device, the notification associated with the operating system event when the operating system event is determined to be restricted; and
providing, by the computing device, the notification on a graphical user interface when the operating system event is determined to be unrestricted.

9. The method of claim 8, wherein the operating system event is associated with a power level, a volume level, or a tray icon.

10. The method of claim 8, further comprising:
receiving, by the computing device, a response to the notification; and
performing, by the computing device, an action based on the response.

11. The method of claim 8, wherein the notification is a read-only notification.

12. The method of claim 8, wherein the notification is provided based on a permission associated with the notification, wherein the permission defines whether the notification is a read-only notification or whether a user is authorized to perform an action based on the notification.

13. The method of claim 8, further comprising:
receiving, by the computing device, configuration information associated with operating system content to be provided while the specific application is being executed, wherein the operating system content is associated with a time, a device name, an Internet Protocol (IP) address, a power level, a cellular signal, a sound, a connection, or a network signal; and
providing, by the computing device, the operating system content based on the configuration information.

14. The method of claim 8, wherein the graphical user interface is an overlay over content of the specific application.

15. A non-transitory machine-readable storage medium storing instructions that, when executed by a processor of a computing device, cause the computing device to:
monitor an operating system of the computing device, wherein the computing device is to operate as a kiosk device to execute a specific application of the computing device while restricting user access to other applications of the computing device;
intercept an operating system event generated by the operating system;
determine, based on a notification restriction list that identifies notifications that are restricted, whether a notification associated with the operating system event is to be restricted;
restrict the notification associated with the operating system event when the operating system event is determined to be restricted;

provide the notification on a graphical user interface when the operating system event is determined to be unrestricted; and determine Whether a user is permitted to interact with fixe notification.

17. The non-transitory machine-readable storage medium of claim 15, wherein the operating system event is associated with a network connection, a power level, a volume level, or a tray icon.

17. The non-transitory machine-readable storage medium of claim 15, Wherein the instructions further cause the computing device to:

receive a response to the notification; and perform an action based on the response.

18. The non-transitory machine-readable storage medium of claim 15, wherein the notification is a read-only notification.

19. The non-transitory machine-readable storage medium of claim 15, wherein the notification is provided based on a permission associated with the notification, wherein the permission defines whether the notification is a read-only notification or whether a user is authorized to perform an action based on the notification.

20. The non-transitory machine-readable storage medium of claim 15, wherein the instructions further cause the computing device to:

receive configuration information associated with operating system content to be provided while the specific application is executed, wherein the operating system content is associated with a time, a device name, an Internet Protocol (IP) address, a power level, a cellular signal, a sound, a connection, or a network signal; and provide the operating system content based on the configuration information.

* * * * *

UNITED STATES PATENT AND TRADEMARK OFFICE
CERTIFICATE OF CORRECTION

PATENT NO. : 10,101,872 B2
APPLICATION NO. : 14/856662
DATED : October 16, 2018
INVENTOR(S) : Irwan Halim et al.

Page 1 of 1

It is certified that error appears in the above-identified patent and that said Letters Patent is hereby corrected as shown below:

On the Title Page

In Column 2, item (57), Abstract, Line 11, delete "even" and insert -- event --, therefor.

In the Claims

In Column 7, Line 4, Claim 15, delete "Whether" and insert -- whether --, therefor.

In Column 7, Line 4, Claim 15, delete "fixe" and insert -- the --, therefor.

In Column 7, Line 11 approx., Claim 17, delete "Wherein" and insert -- wherein --, therefor.

Signed and Sealed this
Nineteenth Day of February, 2019

Andrei Iancu
*Director of the United States Patent and Trademark Office*